US012544607B2

(12) United States Patent
Kuzmics et al.

(10) Patent No.: US 12,544,607 B2
(45) Date of Patent: Feb. 10, 2026

(54) FIRE SUPPRESSING GAS GENERATING DEVICE

(71) Applicant: N2 GLOBAL, SIA, Riga (LV)

(72) Inventors: Mihails Kuzmics, Riga (LV); Mikelis Lapse, Riga (LV); Normunds Nebojs, Riga (LV)

( * ) Notice: Subject to any disclaimer, the term of this patent is extended or adjusted under 35 U.S.C. 154(b) by 478 days.

(21) Appl. No.: 17/997,248

(22) PCT Filed: Apr. 23, 2021

(86) PCT No.: PCT/IB2021/053361
§ 371 (c)(1),
(2) Date: Oct. 27, 2022

(87) PCT Pub. No.: WO2021/220112
PCT Pub. Date: Nov. 4, 2021

(65) Prior Publication Data
US 2023/0166143 A1 Jun. 1, 2023

(30) Foreign Application Priority Data
Apr. 30, 2020 (LV) ............................... P2020000032

(51) Int. Cl.
*A62C 5/00* (2006.01)

(52) U.S. Cl.
CPC .................................... *A62C 5/006* (2013.01)

(58) Field of Classification Search
CPC ......... A62C 5/006; A62C 13/22; A62C 13/00; A62C 13/003; A62C 35/02; A62C 35/10; A62C 35/13; A62C 35/62
See application file for complete search history.

(56) References Cited

U.S. PATENT DOCUMENTS

| | | | | |
|---|---|---|---|---|
| 5,499,843 | A * | 3/1996 | Faigle | B60R 21/2644 422/166 |
| 2008/0135266 | A1 * | 6/2008 | Richardson | A62D 1/06 169/46 |
| 2016/0200283 | A1 * | 7/2016 | Hanano | B60R 21/264 102/530 |

* cited by examiner

*Primary Examiner* — Christopher R Dandridge
(74) *Attorney, Agent, or Firm* — Patshegen IP; Moshe Pinchas

(57) ABSTRACT

Invention relates to fire suppressing gas generating devices, especially to a gas outflow management in the fire suppressing gas generating devices.
A fire suppressing gas generating device comprising a cylindrical housing (1) having at least one discharge opening (13); a plurality of gas generating grains (2); an ignitor (5) associated with the gas generating grain (2) for ignition of said gas generating grain (2); a filter (6) encompassing the plurality of the gas generating grains (2); and at least one gas discharge channel (7) connected to the discharge opening (13). The gas discharge channel (7) further comprises at least two nozzles (17) opposed to each other creating thrust neutrality of discharged gas.

4 Claims, 5 Drawing Sheets

FIRE SUPPRESSING GAS GENERATING DEVICE

FIELD OF THE INVENTION

Invention relates to fire suppressing gas generating devices, especially to a gas outflow management in the fire suppressing gas generating devices.

BACKGROUND OF THE INVENTION

Fire suppressing gas-generating devices are used to suppress fires in enclosed volumes, such as automobiles, planes, ships, server rooms, buildings, etc. Effective gas discharge is necessary to provide satisfactory fire suppressing.

Prior art includes U.S. Pat. No. 7,832,493 that discloses a fire suppression device including a fire suppression agent generator. A container surrounds the fire suppression agent generator and includes a discharge port that directs fire suppression agent in at least two opposed directions. In one example, the discharge port extends substantially around a perimeter of the container.

International patent application publication No. WO 2011/041879 discloses a fire suppressing gas generator, that comprises a cylindrical housing comprising an array of discharge ports distributed generally uniformly therearound. The propellant grains when ignited by the ignition device generate a fire suppressing gas which passes out of the discharge ports of the cylindrical housing for delivery outside from the housing into environment to be suppressed. Similar design is disclosed in the international patent application publication No. WO2019/035015.

The aim of invention is to design a gas generating device that provides effective gas discharge to suppress a fire. In the same time, the design shall be such that it also provides thrust neutrality.

SUMMARY OF THE INVENTION

The aim is reached by design of a fire suppressing gas generating device comprising a cylindrical housing having two open sides and at least one discharge opening on the cylindrical surface of the cylindrical housing. The longitudinal axis of the discharge opening is generally orthogonal to the longitudinal axis of the housing because the discharge opening is made on the cylindrical surface of the cylindrical housing. The cylindrical housing is sealed by closing its two open sides by two end caps, each end cap for each open side. The fire suppressing gas generating device further comprises a plurality of gas generating grains disposed in a stacked relationship within the housing and a filter encompassing the plurality of the gas generating grains. The device further comprises an ignitor positioned at one of the end caps, wherein said end cap may be designated as an ignitor cap. The ignitor is also associated with the gas generating grain for ignition of said gas generating grain.

The fire suppressing gas generating device characterized in that it further comprises at least one gas discharge channel connected to the discharge opening so that generated gases flowing through the discharge opening may enter the gas discharge channel. The longitudinal axis of the gas discharge channel is generally aligned with the longitudinal axis of the discharge opening and generally orthogonal to the to the longitudinal axis of the housing.

The gas discharge channel further comprises at least two nozzles with its longitudinal axis arranged generally orthogonal to the longitudinal axis of the gas discharge channel. At least two nozzles are opposed to each other creating thrust neutrality of discharged gas. The gas discharge channel may have three or more nozzles and the nozzles are arranged around the gas discharge channel so as to provide thrust neutrality of discharged gas. In preferred embodiment the gas discharge channel comprises eight nozzles arranged around the discharge channel in equally distances from each other.

The nozzle itself may be as a hole in the gas discharge channel or as a separate part.

In another embodiment the cylindrical housing comprises a second discharge opening arranged opposite to the discharge opening. The second discharge opening further comprises a second gas discharge channel arranged opposite to the at least one gas discharge channel, and the second gas discharge channel comprises at least two nozzles with its longitudinal axis arranged generally orthogonal to the longitudinal axis of the second gas discharge channel. At least two nozzles are opposed to each other creating thrust neutrality of discharged gas.

Additionally, each gas discharge channel comprises a burst plate arranged in the discharge channel so that the burst plate seals the inner volume of the fire suppressing gas generating device from the outer environment. Upon ignition of the gas generating grains a gas is generated as well as pressure which bursts said burst plate and the gas may escape.

BRIEF DESCRIPTION OF THE DRAWINGS

The drawings illustrate generally, by way of example, but not by way of limitation, various embodiments of the invention.

Figure 1:
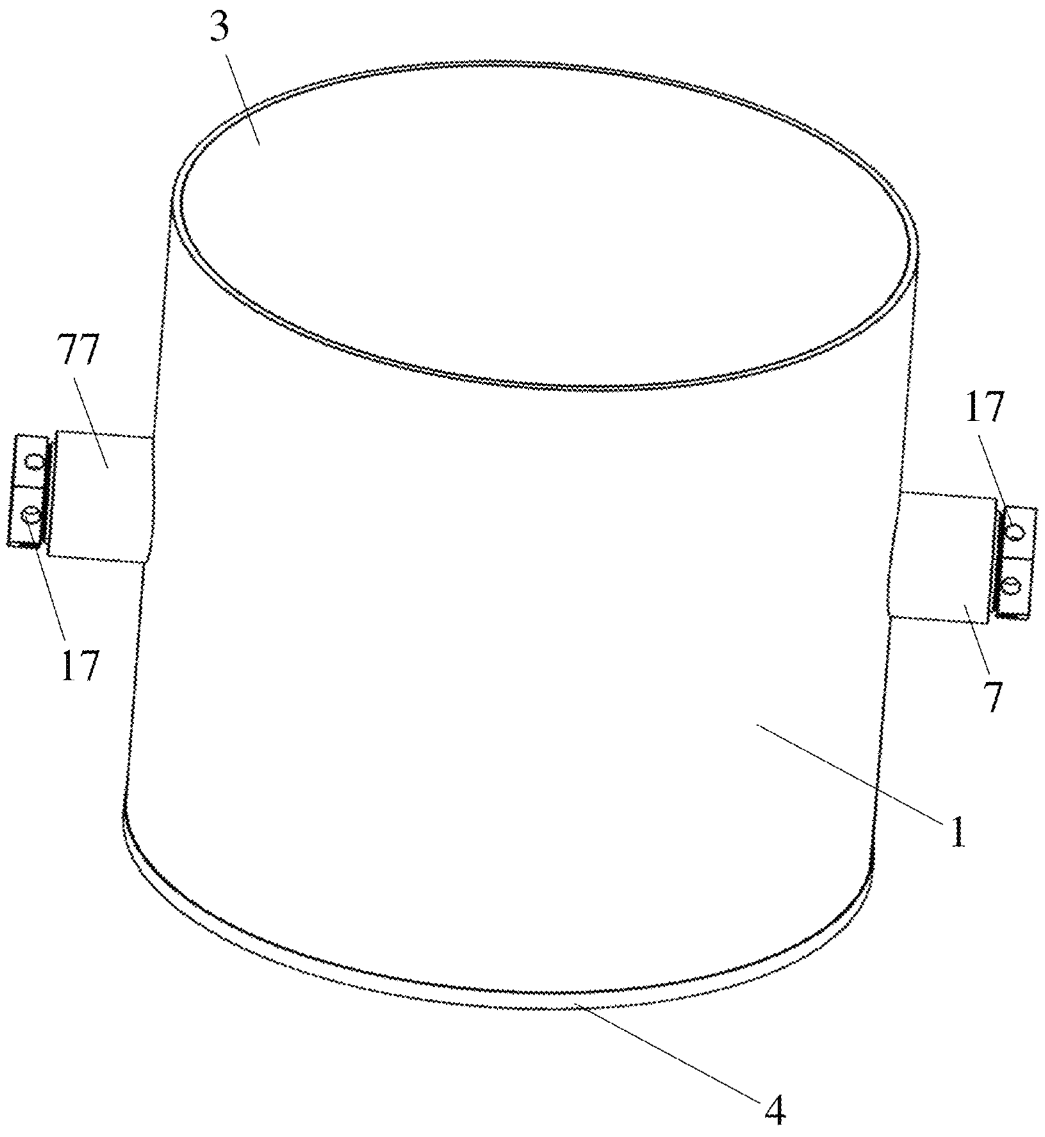
FIG. 1 is a perspective view of one embodiment of a fire suppressing gas generating device having two gas discharge outlets (7), wherein each discharge outlet (7) comprises a nozzle (17).
Figure 2:
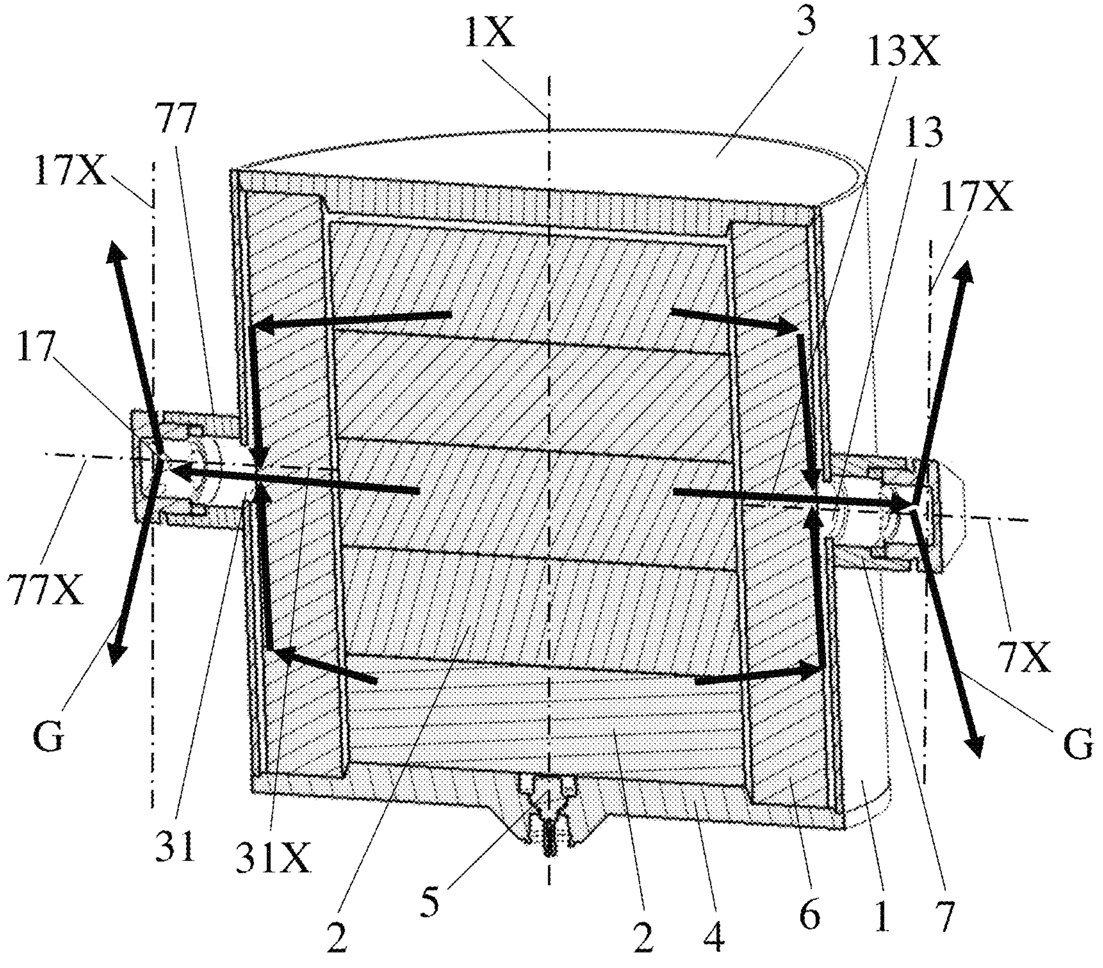
FIG. 2 is a cross-sectional view of the fire suppressing gas generating device as seen in FIG. 1.

In one of the embodiments of the invention a fire suppressing gas generating device comprises a cylindrical housing (1) having two open sides (11; 12) and two discharge openings (13; 31) on the cylindrical surface of the cylindrical housing (1). Both discharge openings (13; 31) are opposed to each other and located in the central part of the cylindrical housing (1). The longitudinal axis (13X; 31X) of the discharge opening (13; 33) is generally orthogonal to the longitudinal axis (1X) of the housing (1). The device further comprises a plurality of gas generating grains (2) disposed in a stacked relationship within the housing (1). The gas generating grains are encompassed by a filter (6). The two open sides (11; 12) on the cylindrical housing (1) are sealable closed by two respective end caps (3; 4). The device further comprises an ignitor (5) positioned at ignitor end cap (4) and associated with the gas generating grain (2) for ignition of said gas generating grain (2). The device further comprises two gas discharge channels (7; 77), wherein each discharge channel (7; 77) is connected to the respective discharge opening (13; 31). Each gas discharge channel (7, 77) comprises a burst plate (8) arranged in the discharge channel (7, 77) so that the burst plate (8) seals the inner volume of the fire suppressing gas generating device from the outer environment.

Figure 3:
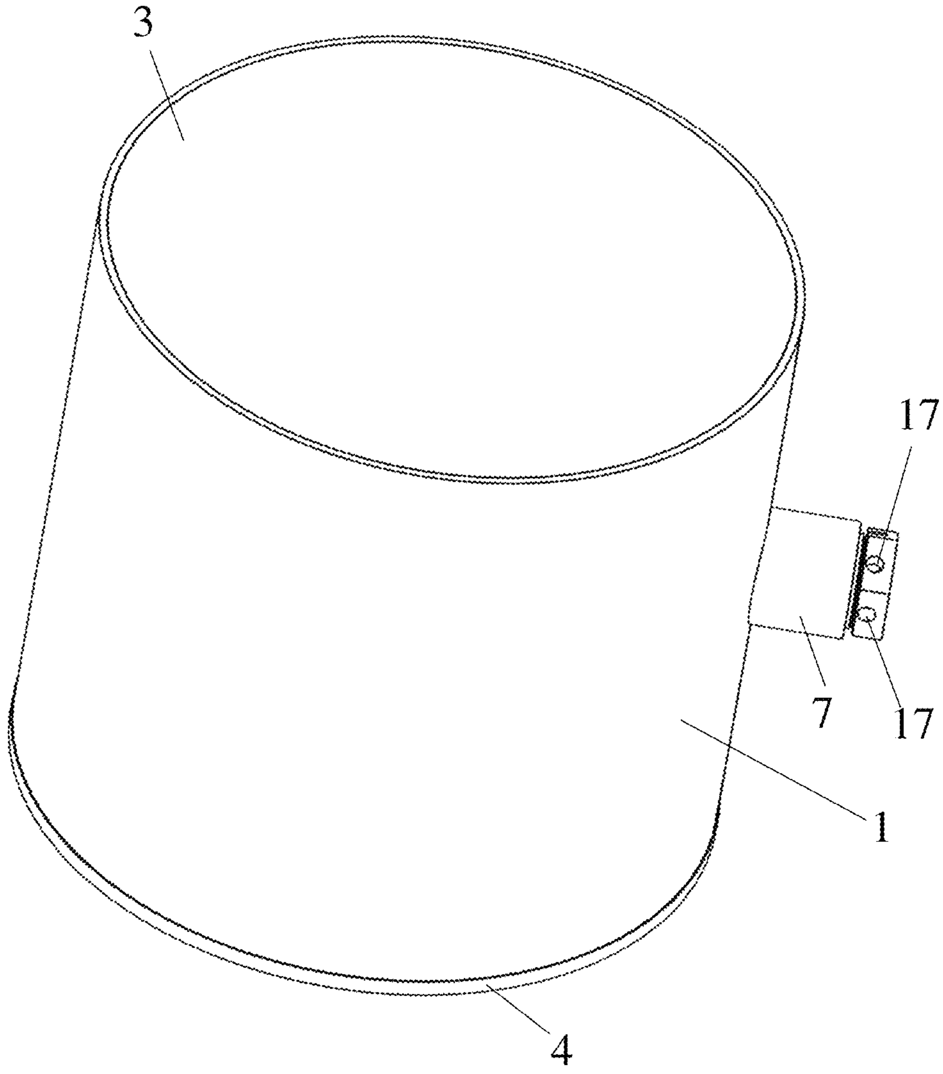
FIG. 3 is a perspective view of another embodiment of a fire suppressing gas generating device having one gas discharge outlets (7) comprising a nozzle (17).
Figure 4:
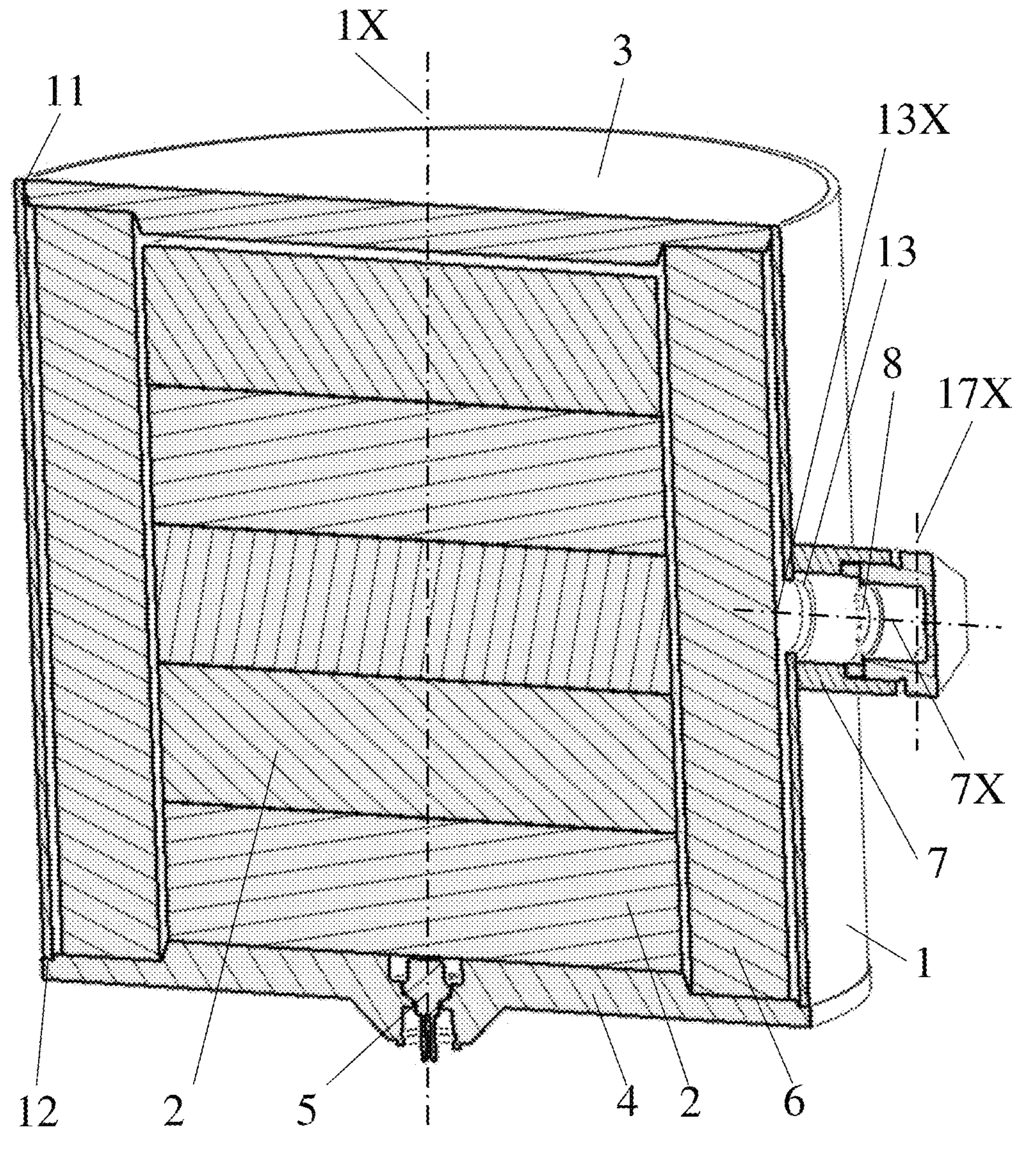
FIG. 4 is a cross-sectional view of the fire suppressing gas generating device as seen in FIG. 3.
Figure 5:
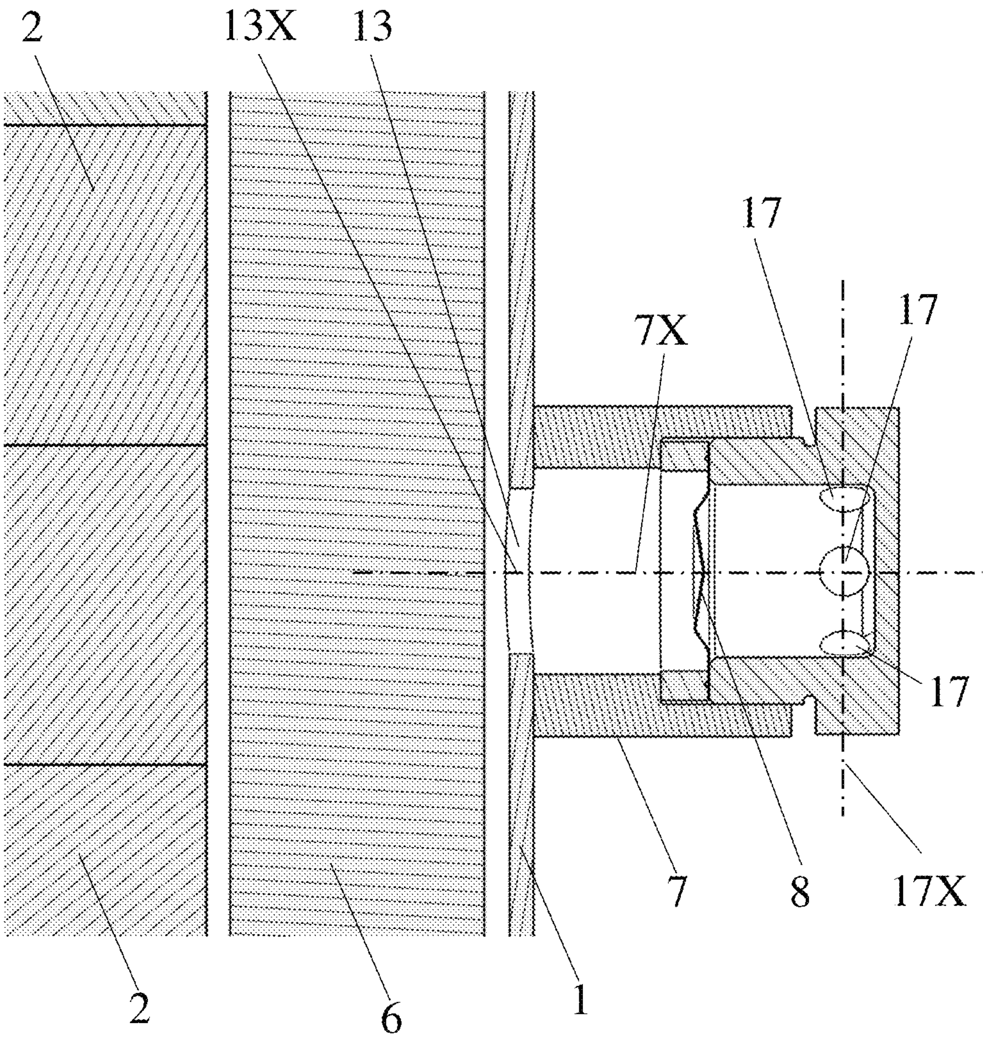
FIG. 5 is a detail view of the gas discharge (7) outlet comprising a burst plate (8) and the nozzle (17) as seen in FIGS. 2 and 4.

In another embodiment of the invention, a fire suppressing gas generating device comprises a cylindrical housing (1) having two open sides (11; 12) and one discharge opening (13) on the cylindrical surface of the cylindrical housing (1). The discharge openings (13) is located in the central part of the cylindrical housing (1). The longitudinal axis (13X) of the discharge opening (13) is generally orthogonal to the longitudinal axis (1X) of the housing (1). The device further comprises a plurality of gas generating grains (2) disposed in a stacked relationship within the housing (1). The gas generating grains are encompassed by a filter (6). The two open sides (11; 12) on the cylindrical housing (1) are sealable closed by two respective end caps (3; 4). The device further comprises an ignitor (5) positioned at ignitor end cap (4) and associated with the gas generating grain (2) for ignition of said gas generating grain (2). The device further comprises one gas discharge channel (7) connected to the discharge opening (13). The gas discharge channel (7) comprises a burst plate (8) arranged in the discharge channel (7) so that the burst plate (8) seals the inner volume of the fire suppressing gas generating device from the outer environment. The longitudinal axis (7X) of the gas discharge channel (7) is generally aligned with the longitudinal axis (13X) of the discharge opening (13) and generally orthogonal to the to the longitudinal axis (1X) of the housing (1). The gas discharge channel (7) comprises eight openings or nozzles (17) with its longitudinal axis (17X) arranged generally orthogonal to the longitudinal axis (7X) of the gas discharge channel (7). Eight nozzles (17) are arranged evenly around the gas discharge channel (7) so that a discharged gas flow (G) distributes evenly therearound creating thrust neutrality of discharged gas (see FIGS. 3, 4 and 5).

While the invention may be susceptible to various modifications and alternative forms, specific embodiments of which have been shown by way of example in the figures and have been described in detail herein, it should be understood that the invention is not intended to be limited to the particular forms disclosed. Rather, the invention includes all modifications, equivalents, and alternatives falling within the scope of the invention as defined by the following claims.

LIST OF REFERENCES

1—a cylindrical housing;
1X—a longitudinal axis of the housing;
2—a gas generating grain;
3—a cap;
4—an ignitor cap;
5—an ignitor;
6—a filter;
7—a gas discharge channel;
7X—a longitudinal axis of the gas discharge channel;
8—a burst plate;
11 and 12—an open side of a cylindrical housing;
13—a discharge opening;
13X—a longitudinal axis of a discharge opening;
17—a nozzle;
17X—a longitudinal axis of a nozzle;
31—a second discharge opening;
31X—a longitudinal axis of a second discharge opening
77—a second gas discharge channel;
77X—a longitudinal axis of the second gas discharge channel;
G—a gas flow.

The invention claimed is:

1. A fire suppressing gas generating device comprising:
a cylindrical housing having a cylindrical surface extending along a longitudinal axis (1X) of the housing between two open sides, and defining an inner volume;
a plurality of gas generating grains disposed in a stacked relationship within the inner volume of the housing;
two end caps, wherein each end cap is fixed to each open side of the cylindrical surface such that said housing is sealable by said cylindrical surface and said two end caps;
an ignitor positioned at one of the end caps and associated with the gas generating grain for ignition of said gas generating grain;
a filter disposed inside said inner volume and encompassing the plurality of the gas generating grains;
at least one discharge opening defined on said cylindrical surface and configured to discharge gas from said inner volume to an outer environment, said discharge opening includes a gas discharge channel directly connected to the discharge opening and protruding from an outer surface of said cylindrical surface, said discharge opening and discharge channel extending along a longitudinal axis orthogonal to the longitudinal axis of the housing;
wherein the gas discharge channel comprises at least two nozzles with a longitudinal axis of the nozzles arranged orthogonal to the longitudinal axis of the gas discharge channel; and
wherein the nozzles are opposed to each other creating thrust neutrality of discharged gas.

2. The fire suppressing gas generating device according to claim 1, wherein said cylindrical surface comprises a second discharge opening arranged opposite to the discharge opening, wherein the second discharge opening further comprises a second gas discharge channel arranged opposite to the at least one gas discharge channel, and the second gas discharge channel comprises additional nozzles with a longitudinal axis of the additional nozzles arranged orthogonal to the longitudinal axis of the second gas discharge channel, and wherein the additional nozzles are opposed to each other creating thrust neutrality of discharged gas.

3. The fire suppressing gas generating device according to claim 1 characterized in that each gas discharge channel comprises a burst plate arranged in the discharge channel so that the burst plate seals the inner volume of the fire suppressing gas generating device from the outer environment.

4. The fire suppressing gas generating device according to claim 1, characterized in that the gas discharge channel comprises eight nozzles arranged around the discharge channel in equally distances from each other.

* * * * *